United States Patent [19]

Collard et al.

[11] Patent Number: 4,592,439

[45] Date of Patent: Jun. 3, 1986

[54] MULTI-PURPOSE, ALL TERRAIN VEHICLE

[76] Inventors: Andre Collard, Rue de Tours; Michel Collard, Lotissement "Les Tartelettes", both of Bouzy, Marne, France

[21] Appl. No.: 585,573

[22] Filed: Mar. 2, 1984

[30] Foreign Application Priority Data

Mar. 4, 1983 [FR] France ............................. 83 03970

[51] Int. Cl.⁴ .............................................. B62D 5/06
[52] U.S. Cl. ...................................... 180/140; 180/41; 180/236; 180/242; 280/6 R
[58] Field of Search ............... 180/41, 140, 242, 236; 280/6 H, 6.1, 6 R

[56] References Cited

U.S. PATENT DOCUMENTS

| | | | |
|---|---|---|---|
| 3,197,229 | 7/1965 | Houlton | 180/140 |
| 3,286,602 | 11/1966 | Butner et al. | 92/28 |
| 3,909,022 | 9/1975 | Claxton | 280/6 H |
| 4,398,616 | 8/1983 | Braden et al. | 180/140 |
| 4,408,773 | 10/1983 | Meller et al. | 280/6 H |
| 4,412,594 | 11/1983 | Furukawa et al. | 180/140 |

FOREIGN PATENT DOCUMENTS

| | | | |
|---|---|---|---|
| 40929 | 4/1978 | Japan | 180/140 |
| 136041 | 10/1979 | Japan | 180/140 |

Primary Examiner—Edward G. Favors
Assistant Examiner—Steven E. Warner
Attorney, Agent, or Firm—Remy J. VanOphem

[57] ABSTRACT

A multi-purpose, all terrain vehicle with four independently suspended driving wheels and high ground clearance. The vehicle height can be independently controlled at each wheel to maintain the vehicle chassis level over rough terrain. Further, the front wheels can be steered together but independently of the rear wheels, which are also steerable together so that the vehicle is capable of extremely tight turns and movement in a direction at an angle to its longitudinal axis. The configuration of the vehicle provides substantial flexibility of the installation of working accessories to the front, rear and middle of the vehicle chassis.

4 Claims, 14 Drawing Figures

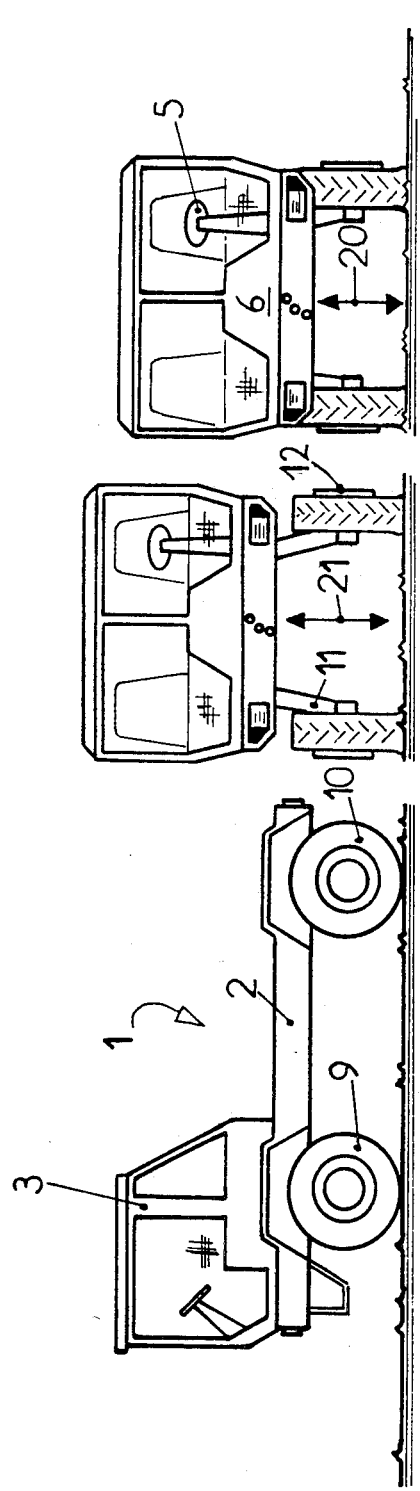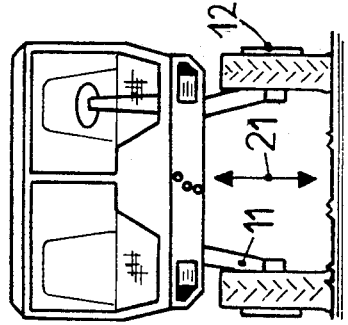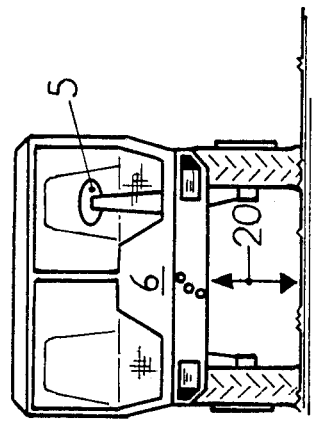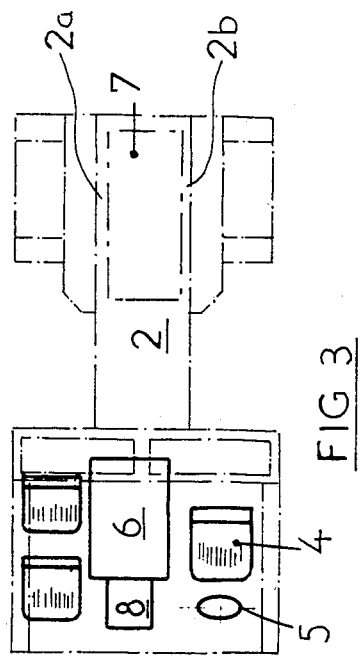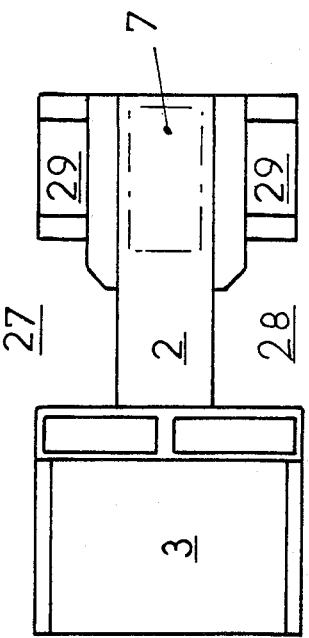

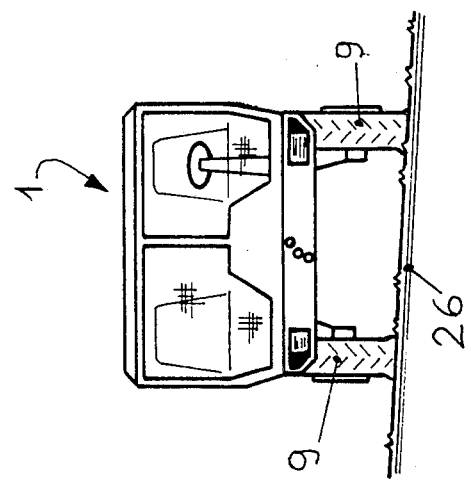
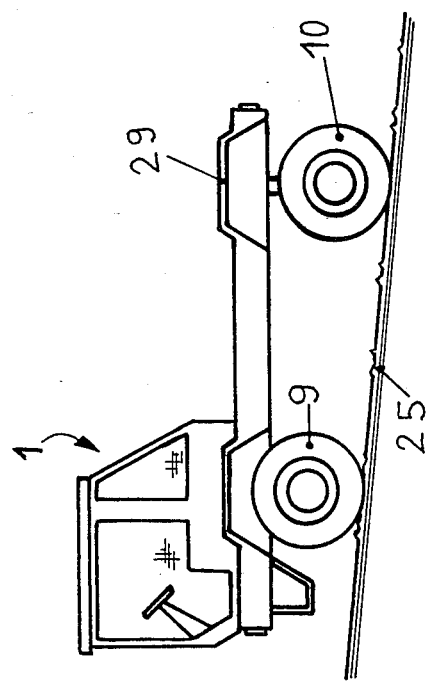

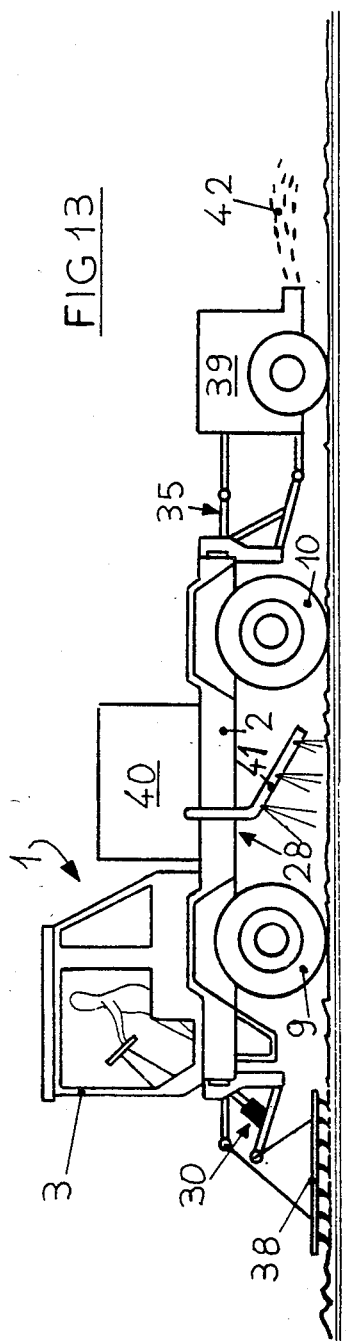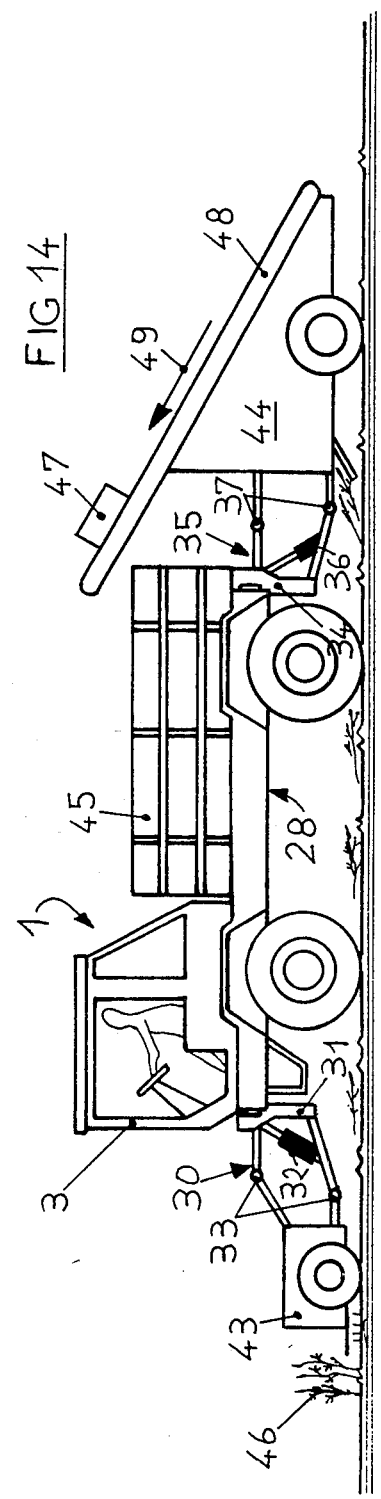

MULTI-PURPOSE, ALL TERRAIN VEHICLE

BACKGROUND OF THE INVENTION

The present invention relates to a new type of multi-purpose vehicle which can be used for the most diverse applications. In particular, such a vehicle can travel on broken ground to transport people and can also be utilized as an agricultural machine in fields or forests.

SUMMARY OF THE INVENTION

The invention is a multi-purpose vehicle which consists of a chassis, carrying a heat engine, mounted on four driving wheels. Each of the four wheels is independently drivable and, at the same time, the front and rear wheels are independently steerable. The transmission between the heat engine and each of the four wheels is entirely hydraulic, which permits mounting each wheel on an independent suspension arm thus, considerably increasing the ground clearance by eliminating all axles and maintaining a stable chassis position even on rough terrain.

The vehicle includes a steering position for the driver to actuate a steering wheel.

According to another feature of the invention, the steering wheel is connected to each of the four steering wheels via a steering transmission which is entirely hydraulic and which permits separate steering of only two wheels or all four wheels. The possibility also exists for steering the vehicle to advance "crabwise", such that the shafts of the four wheels are mutually parallel but no longer perpendicular to the longitudinal geometric axis of the chassis.

According to another feature of the invention, each of the four suspension arms is equipped with a suspension jack supported on the chassis, the four suspension jacks being controlled from the steering position by means of a central computer which can automtically maintain the chassis in a horizontal position, regardless of the position of each of the wheels.

According to another feature of the invention, the chassis carries, at the front, the steering cabin, and at the rear, the oil reservoir for the hydraulics, while the central part of the vehicle remains uncluttered at both sides, leaving it free for mounting various accessories on the sides in the area between the wheels.

According to another feature of the invention, the chassis includes, both at the rear and at the front, three-point mountings which are demountable.

According to another feature of the invention, the vehicle includes, both in front and at the rear, a power takeoff which is height-adjustable, permitting the corresponding transmission shaft to operate always at the best angle for the Cardan joint which drives the accessories mounted at the front or at the rear of the vehicle.

The accompanying drawings, given as non-limiting examples, will permit a better comprehension of the present invention.

BRIEF DESCRIPTION OF THE DRAWINGS

FIG. 1 is a side elevational view of a multi-purpose vehicle according to the invention;

FIG. 2 is a plan view of the vehicle of FIG. 1;

FIG. 3 is a plan view showing the orientation of various elements;

FIG. 4 is a front elevational view of the vehicle in a normal position;

FIG. 5 is a front elevational view of the vehicle in an elevated position;

FIGS. 6 and 7 are views illustrating the operation of the suspension to maintain the position of the chassis constantly horizontal, regardless of the slope of the terrain;

FIGS. 13 and 14 are side elevational views showing two suggested ways of equipping the vehicle for agricultural applications.

DETAILED DESCRIPTION OF THE PREFERRED EMBODIMENT

Figure 8:
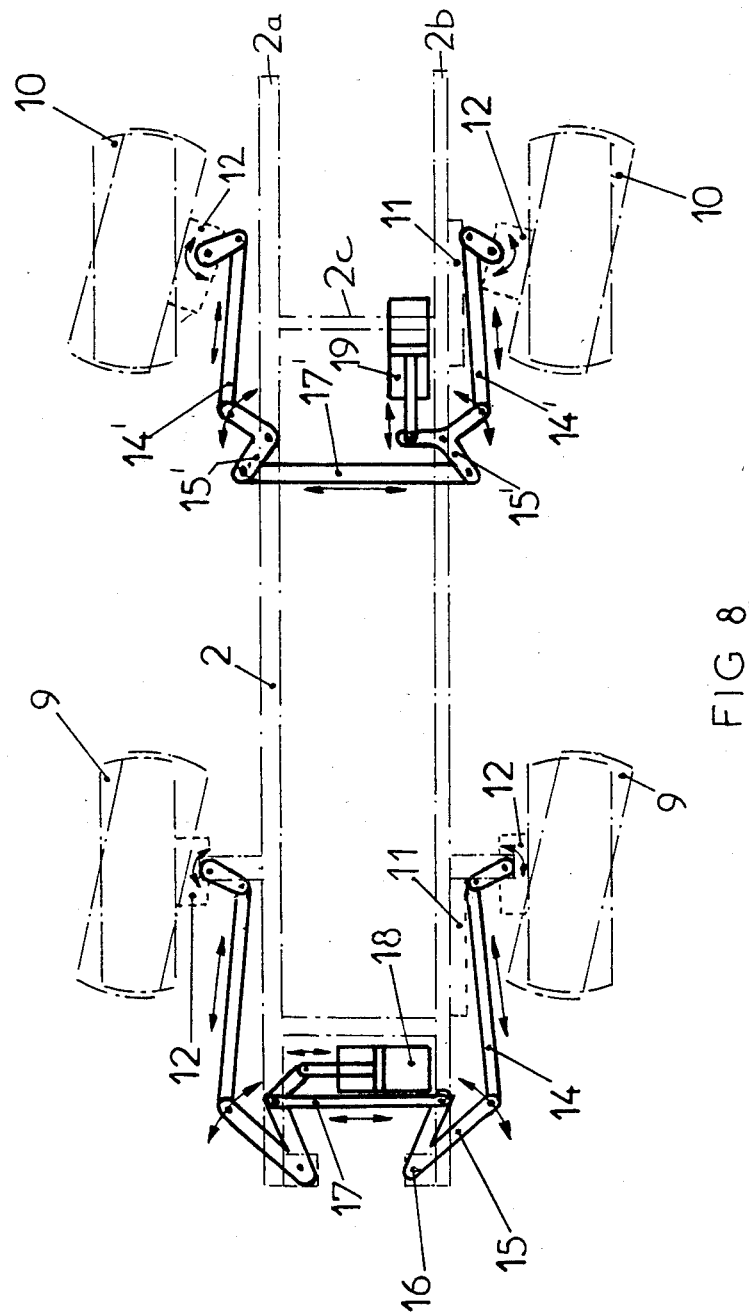
FIG. 8 is a diagrammatic plan view illustrating the kinematics and the hydraulic control of the steering acting on the four orientable wheels.

The vehicle 1 shown in the drawings includes a longitudinal chassis 2, the forward part of which carries a cabin 3. In this cabin are the driver's seat 4, situated facing a steering wheel 5. Under the central part of the cabin 3 is a compartment 6 for a heat engine. This engine drives a hydraulic pump 8, which is connected by ducts (not shown) to an oil reservoir 7 located at the rear between the side members 2a and 2b of the chassis 2.

The vehicle chassis is carried by four wheels, namely two front wheels 9 and two rear wheels 10, each of which wheels is attached to the free end of an oscillating suspension arm 11. Each of the four wheels 9 and 10 includes a hub 12, into which is incorporated a hydraulic motor which is fed by the hydraulic pump 8. A hydraulic distribution and control panel, not shown, is located on a dashboard in the cabin 3. Each hub 12, with its respective incorporated hydraulic motor for each of the four wheels 9 and 10, is articulable with respect to the suspension arm 11 to which it is attached. Therefore, each of the four wheels 9 and 10 is selectively drivable and steerable.

There is shown in FIG. 8 one embodiment of a linkage mechanism interconnecting, on the one hand, the front wheels 9, and on the other hand, the rear wheels 10. The steering linkage for each of the front wheels connecting link 14 with one end attached to a rocking lever 5, which articulates about a fixed point 16 on the front of the chassis, and another end attached to one end of a transverse steering rod 17. The transverse steering rod 17 is controlled by a double-action steering jack 18 disposed transverse to and located at the front of the 15 chassis 2.

As stated, for steering the rear wheels 10 there is utilized, in the same manner, a linkage with connecting link 14', rocking lever 15', actuated by a transverse steering rod 17', controlled by a double-action steering jack 19 which is disposed transverse to one of the transverse members 2c of the chassis 2.

It is understood, that by means of the above described independent steering system, no transverse axle connects either the two front wheels 9 or the two rear wheels 10. Consequently, referring to FIGS. 4 and 5, the ground clearance 20 of the vehicle in normal driving position, shown in FIG. 4, and the ground clearance 21 in elevated position, shown in FIG. 5, are both relatively large, which is very suitable for travel on very rough terrain.

Each suspension arm 11 of the four independent wheels 9 and 10 is subjected to the action of a suspension jack (not shown). This type of jack is well known, for example, on vehicles with a hydropneumatic suspension. As known in the art, the driver can increase at will, from the controls located on the dashboard, the mean length of these suspension jacks to cause the vehicle to go from its normal position, as shown in FIG. 4, to its elevated position, shown in FIG. 5, in order to run on particularly rough terrain.

Figure 9:
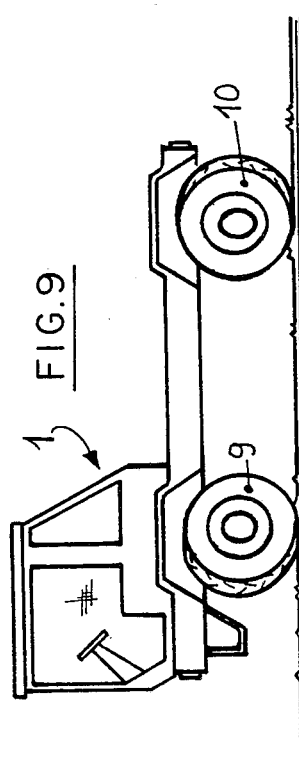
FIG. 9 is a side elevational view showing the four wheels locked for a very short radius turning circle.
Figure 10:
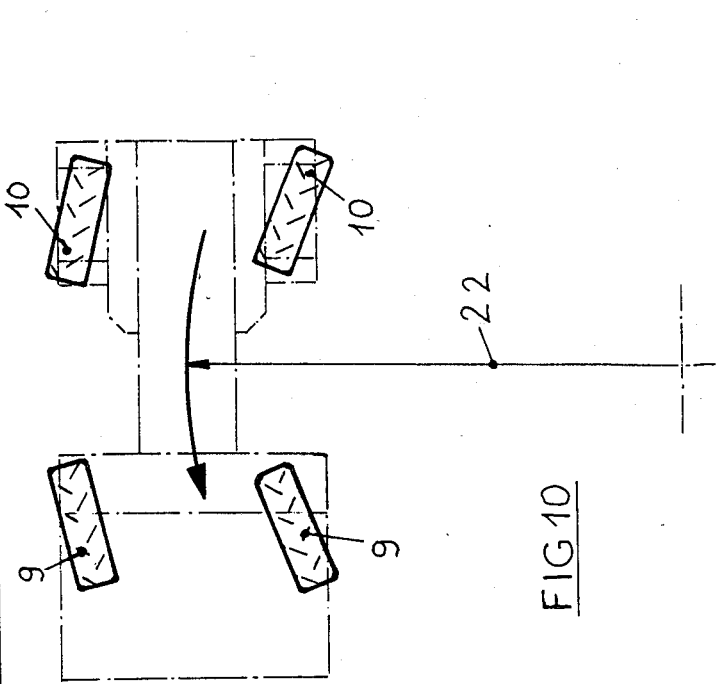
FIG. 10 is a plan view corresponding to FIG. 9.

The steering column actuated by the steering wheel 5 is connected to the two steering jacks 18 and 19 solely by hydraulic lines, without any other mechanical connection. The steering wheel 5, thus, controls hydraulic distributors (not shown), of a known type, which can actuate the two jacks 18 and 19 either separately or at the same time, with or without synchronization. This feature has, in particular, the advantage of permitting the two following maneuvers;

In the configuration of FIGS. 9 and 10, the front wheels 9 are both locked to the left, while the rear wheels 10 are both locked to the right. As a result, the vehicle is in position for a turn to the left at a turning radius 22 which is extraordinarily small.

Figure 11:
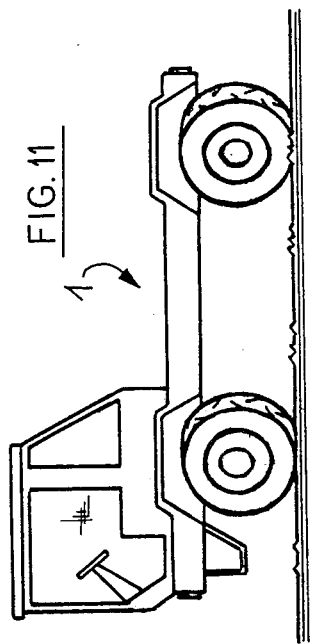
FIG. 11 is a side elevational view showing the four wheels locked to cause the vehicle to advance "crabwise"
Figure 12:
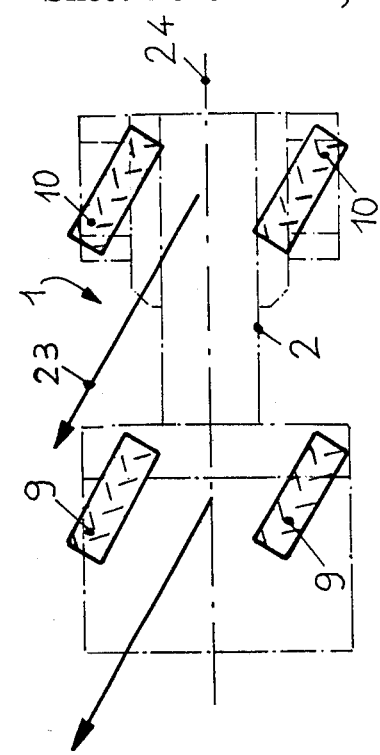
FIG. 12 is a plan view corresponding to FIG. 11.

In the configuration of FIGS. 11 and 12, the front wheels 9 are locked to the right, in the same manner as the rear wheels 10. As a result, the vehicle moves "crabwise", that is, it can advance in a straight line in a direction shown by arrow 23 which does not coincide with the direction of the mean longitudinal axis 24 of the chassis 2.

The suspension jacks of the independently oscillating suspension arms 11 are controlled from a hydraulic control station of a known type. However, in this invention, this station includes a computer which can, at each instant, separately control each of the four suspension jacks, so that, if desired, one can maintain the position of the chassis 2 stable and constantly horizontal. Thus, referring to FIG. 6, on terrain 25 with a longitudinally rising slope, the suspension jacks of the rear wheels 10 are lengthened more than the jacks of the front wheels 9. On the other hand, as shown in FIG. 7, when the vehicle 1 travels transversely to a hillside, the suspension jacks of the two right wheels are shorter at their mean length position than the suspension jacks of the two left wheels to compensate for the slope of the terrain 26 as shown in FIG. 7.

It will be particularly noted in FIGS. 2, 3, 8, 10 and 12 that the structure of the vehicle according to the invention has the feature of defining, on either side of the central part of the chassis 2, free spaces 27 and 28, as particularly shown in FIG. 2, which remain usable for mounting various agricultural machinery or other accessories. Each free space 27 and 28 is disposed behind the cabin 3 and has a combined width corresponding to the track 29 of the rear wheels. In other words, in plan view, the vehicle 1 according to the invention has a narrow structure in its central part, as shown in FIG. 2. This configuration is important, particularly for agricultural applications of the type illustrated in FIGS. 13 and 14.

Referring to the embodiments shown in FIGS. 13 and 14, the vehicle according to the invention may be equipped with a removable small plate 31, on which is provided a three-point mounting 30 of the kind commonly utilized for attaching agricultural machines. Additionally, the three-point mounting 30 on the vehicle, according to the invention, is articulated and has an adjusting jack 32 which enables adjustment of each of the three mounting points 33 to a desired height relative to the ground.

Likewise, there can be fitted to the rear a removable small plate 34 and a three-point mounting 35 provided with an adjusting jack 36. By means of this adjusting jack 36, the height above the ground of the three mounting points 37 can be adjusted.

It will be seen that the general structure of the vehicle according to the invention, and particularly the presence of the lateral free spaces 27 and 28, offers numerous possibilities as illustrated by the two embodiments shown in FIGS. 13 and 14.

In FIG. 13, a harrow 38 has been fitted to the front mounting 30, while a sowing machine 39 has been connected to the rear mounting 35. Furthermore, on the central part of the chassis 2 there has been placed a fertilizer distributor 40, the distributing chutes 41 of which are positioned in the free lateral spaces 27 and 28. By means of this positioning, the vehicle 1 thus equipped can harrow the ground, spread fertilizer, and distribute seed 42, all in a single passage.

Another possibility is illustrated in FIG. 14, with a mower 43 fitted to the front, a pick-up press 44 fixed to the rear, and a storage bin 45 located on the chassis 2. In this case, when the vehicle 1 thus equipped advances, for example, over a meadow to be mowed, the mower 43 cuts the grass 46, which falls to the ground to be subsequently collected by the pick-up press 44. This pick-up press 44 presses the straw or the hay to form bales 47, which a conveyor 48 lifts in the direction of the arrow 49 until they are tipped into the storage bin 45. Therefore the vehicle 1, thus equipped, can in a single passage perform all the operations of harvesting and removal.

In the examples of FIGS. 13 and 14, three operating positions have been provided on the vehicle 1. In certain cases, even four positions could be provided. For example, an alfalfa blower could be mounted in front to collect the alfalfa and discharge it over the cabin 3 into a silo provided on the chassis 2, behind the cabin 3. One could also control the steering by means of a laser beam which would automatically regulate the position of the wheels 9 and 10 as the vehicle advances along a predetermined path. This would maintain the vehicle in a controlled, straight-line path.

Furthermore, the vehicle configuration described permits the provision in the cabin 3 of a driving position which can pivot on its own axis for ease of driving the vehicle in either direction.

Finally, as pointed out, the form and disposition of the elements of the chassis 2 confer on the whole vehicle 1 a characteristic "wasp waist" contour (FIGS. 2, 3, 10 and 12).

Having thus described the present invention by way of a detailed description of an exemplary embodiment, it will be apparent to those skilled in the art that many modifications may be made from the exemplary embodiment without departing from the spirit of the present invention or the scope of the claims appended hereto.

What is claimed as novel is as follows:

1. A multi-purpose, all terrain vehicle comprising:
   a chassis comprised of a left side longitudinal member and a right side longitudinal member, each said right side and said left side longitudinal member having a first end connected to a front chassis member and having a second end connected to a rear chassis member;

a plurality of individual wheels comprising a left front wheel mounted to said front chassis member, a right front wheel mounted to said front chassis member, a right rear wheel mounted to said rear chassis member, and a left rear wheel mounted on said rear chassis member;

a first steering means for steering said right front and said left front wheels together;

a second steering means for steering said right rear and said left rear wheels together, said second steering means being independent of said first steering means; and means located at each of said individual wheels for independently adjusting the height of said chassis at the location of each said individual wheel, wherein;

one of said first steering means and said second steering means comprises:

a hydraulic piston cylinder mounted to said chassis;

a first link member pivotably attached to said chassis at a pivot point in said first link member, said first link member having a first arm, a second arm, and a third arm extending from said pivot point, said first arm attached to and driven by said hydraulic piston cylinder;

a steering rod having a first end and a second end, said first end being attached to said second arm of said first link member;

a first connecting link connecting said third arm to one of said individual wheels;

a second link member pivotally attached to said chassis at a pivot point in said second link member, said second link member further having a fourth arm and a fifth arm, said fourth arm being attached to said second end of said steering rod; and a second connecting link connecting said fifth arm to another of said individual wheels.

2. A multi-purpose, all terrain vehicle as claimed in claim 1 further comprising:

a cabin located over said front chassis member; and a steering control position located in said cabin, said steering control position being pivotable to enable an operator of said vehicle to face in the direction of vehicle motion.

3. A multi-purpose, all terrain vehicle as claimed in claim 1 wherein said means for independently adjusting the height at the location of each said individual wheel comprises a hydraulically operated suspension jack device.

4. A multi-purpose, all terrain vehicle as claimed in claim 1 further comprising an individual hydraulic transmission driving device located at each of said individual wheels for applying rotational driving force to each of said individual wheels.

* * * * *

UNITED STATES PATENT AND TRADEMARK OFFICE
CERTIFICATE OF CORRECTION

PATENT NO. : 4,592,439

DATED : June 3, 1986

INVENTOR(S) : Andre Collard et al

It is certified that error appears in the above-identified patent and that said Letters Patent is hereby corrected as shown below:

Column 1, line 39, delete " automtically " and insert ---- automatically ----.

Column 2, line 50, delete " 5 " and insert ---- 15 ----.

Column 3, line 21 after " maneuvers " delete a semicolon " ; " and insert a colon ---- : ----.

Signed and Sealed this
Twenty-first Day of October, 1986

[SEAL]

*Attest:*

DONALD J. QUIGG

*Attesting Officer*  *Commissioner of Patents and Trademarks*